US012632739B2

(12) United States Patent
Wang et al.

(10) Patent No.: US 12,632,739 B2
(45) Date of Patent: May 19, 2026

(54) TEXT-BASED EVENT DETECTION METHOD AND APPARATUS, COMPUTER DEVICE, AND STORAGE MEDIUM

(71) Applicant: Tencent Technology (Shenzhen) Company Limited, Shenzhen (CN)

(72) Inventors: Xiaozhi Wang, Shenzhen (CN); Zhiyuan Liu, Shenzhen (CN); Xu Han, Shenzhen (CN); Maosong Sun, Shenzhen (CN); Peng Li, Shenzhen (CN); Jie Zhou, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 1232 days.

(21) Appl. No.: 17/367,130

(22) Filed: Jul. 2, 2021

(65) Prior Publication Data

US 2021/0334665 A1 Oct. 28, 2021

Related U.S. Application Data

(63) Continuation of application No. PCT/CN2020/093189, filed on May 29, 2020.

(30) Foreign Application Priority Data

May 31, 2019 (CN) .......................... 201910471605.1

(51) Int. Cl.
G06N 3/088 (2023.01)
G06N 3/045 (2023.01)
(52) U.S. Cl.
CPC ............. *G06N 3/088* (2013.01); *G06N 3/045* (2023.01)
(58) Field of Classification Search
CPC ............................... G06N 3/088; G06N 3/045
(Continued)

(56) References Cited

U.S. PATENT DOCUMENTS 9,224,386 B1 * 12/2015 Weber ...................... G10L 15/06
2010/0082331 A1 * 4/2010 Brun ...................... G06F 40/205
704/9
(Continued)

FOREIGN PATENT DOCUMENTS

CN 106557566 A 4/2017
CN 109492764 A 3/2019
(Continued)

OTHER PUBLICATIONS

Li et al, 2018, "A Generative Model for category text generation" (Year: 2018).*

(Continued)

*Primary Examiner* — Abdullah Al Kawsar
*Assistant Examiner* — Jun Kwon
(74) *Attorney, Agent, or Firm* — Banner & Witcoff, Ltd.

(57) ABSTRACT

A training method includes obtaining a first data set and a second data set, each of the first data set and the second data set including event instances, the event instances include text and events corresponding to the text. The training method also includes training an adversarial network using the first data set and the second data set, the adversarial network includes processing circuitry configured as a generator and a discriminator. The discriminator is configured to output first reliable probabilities of the event instances in the first data set, and second reliable probabilities of the event instances inputted by the generator. A loss function of the adversarial network is used to adjust a parameter of the adversarial network, to maximize the first reliable probabilities and minimize the second reliable probabilities. The method further includes obtaining, by the trained adversarial network, a reliable event instance in the second data set.

16 Claims, 8 Drawing Sheets

(58) Field of Classification Search
USPC ............................................................ 706/25
See application file for complete search history.

(56) References Cited

U.S. PATENT DOCUMENTS

| | | | |
|---|---|---|---|
| 2018/0314716 A1* | 11/2018 | Kim | ......................... G06T 1/20 |
| 2019/0114348 A1 | 4/2019 | Gao | |
| 2019/0122120 A1* | 4/2019 | Wu | ......................... G06N 3/084 |

FOREIGN PATENT DOCUMENTS

| | | |
|---|---|---|
| CN | 109766432 A | 5/2019 |
| CN | 110188172 A | 8/2019 |

OTHER PUBLICATIONS

Visa et al, 2011, "Confusion Matrix-based Feature Selection" (Year: 2011).*
Yuan et al, 2017, "Hard-Aware Deeply Cascaded Embedding" (Year: 2017).*
Lopez-Paz & Oquab, "Revisiting Classifier Two-Sample Tests", 2018 (Year: 2018).*
International Search Report and Written Opinion Issued Dec. 28, 2020 in International Application No. PCT/CN2020/093189, with English translation, 9 pgs.

* cited by examiner

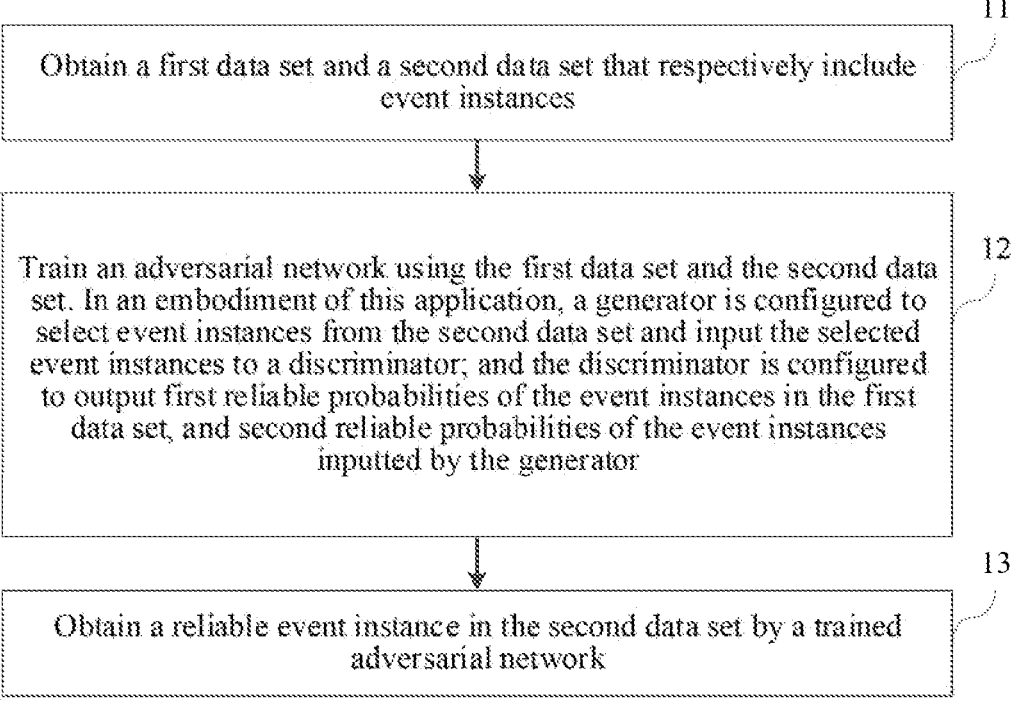

11

Obtain a first data set and a second data set that respectively include event instances

12

Train an adversarial network using the first data set and the second data set. In an embodiment of this application, a generator is configured to select event instances from the second data set and input the selected event instances to a discriminator; and the discriminator is configured to output first reliable probabilities of the event instances in the first data set, and second reliable probabilities of the event instances inputted by the generator

13

Obtain a reliable event instance in the second data set by a trained adversarial network

FIG. 1

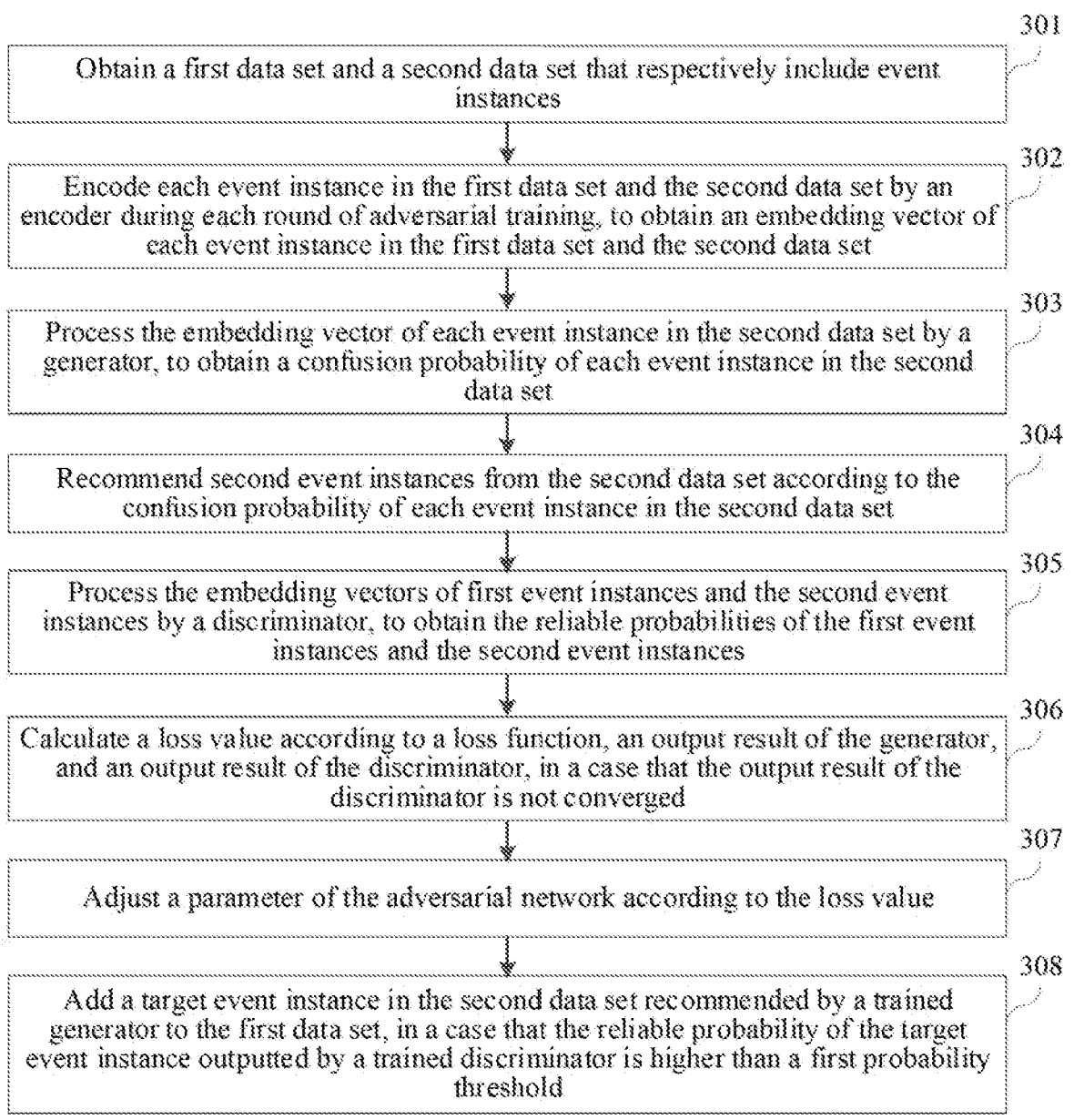

301 Obtain a first data set and a second data set that respectively include event instances 302 Encode each event instance in the first data set and the second data set by an encoder during each round of adversarial training, to obtain an embedding vector of each event instance in the first data set and the second data set 303 Process the embedding vector of each event instance in the second data set by a generator, to obtain a confusion probability of each event instance in the second data set 304 Recommend second event instances from the second data set according to the confusion probability of each event instance in the second data set 305 Process the embedding vectors of first event instances and the second event instances by a discriminator, to obtain the reliable probabilities of the first event instances and the second event instances 306 Calculate a loss value according to a loss function, an output result of the generator, and an output result of the discriminator, in a case that the output result of the discriminator is not converged 307 Adjust a parameter of the adversarial network according to the loss value 308 Add a target event instance in the second data set recommended by a trained generator to the first data set, in a case that the reliable probability of the target event instance outputted by a trained discriminator is higher than a first probability threshold

FIG. 3

TEXT-BASED EVENT DETECTION METHOD AND APPARATUS, COMPUTER DEVICE, AND STORAGE MEDIUM

RELATED APPLICATIONS

This application is a continuation of International Application No. PCT/CN2020/093189, filed on May 29, 2020, which claims priority to Chinese Patent Application No. 201910471605.1, entitled "TEXT-BASED EVENT DETECTION METHOD AND APPARATUS, COMPUTER DEVICE, AND STORAGE MEDIUM" and filed on May 31, 2019. The entire disclosures of the prior applications are hereby incorporated by reference in their entirety.

FIELD OF THE TECHNOLOGY

This application relates to the field of artificial intelligence technology, including a text-based event detection method and apparatus, a computer device, and a storage medium.

BACKGROUND OF THE DISCLOSURE

Text-based event detection, an important subtask of event extraction, is of great significance to downstream natural language processing applications, such as question answering, information retrieval, and reading comprehension.

In the related technology, text-based event detection may be implemented by a convolutional neural network. For example, training data is obtained by manually labeling in advance. The training data, in addition to text (such as a complete sentence), also includes a trigger word manually labeled in the text and an event corresponding to the trigger word. Machine learning training is performed on the convolutional neural network using the manually labeled training data. Then, the trained convolutional neural network is used to process unlabeled text, so as to determine a trigger word in the unlabeled text, to further determine an event corresponding to the unlabeled text according to the trigger word.

However, the solution in the related technology requires training data to be manually labeled, which induces a bottleneck in training efficiency and accuracy of a model, thereby lowering efficiency and accuracy of the text-based event detection.

SUMMARY

Embodiments of this application provide a text-based event detection method and apparatus, a computer device, and a storage medium. In an embodiment, a training method includes obtaining a first data set and a second data set, each of the first data set and the second data set including event instances, the event instances include text and events corresponding to the text. The first data set includes standard event instances, and the second data set includes non-standard event instances. The training method also includes training an adversarial network using the first data set and the second data set, the adversarial network includes processing circuitry configured as a generator and a discriminator. The generator is configured to select event instances from the second data set and input the selected event instances to the discriminator. The discriminator is configured to output first reliable probabilities of the event instances in the first data set, and second reliable probabilities of the event instances inputted by the generator. A loss function of the adversarial network is used to adjust a parameter of the adversarial network, to maximize the first reliable probabilities and minimize the second reliable probabilities. The method further includes obtaining, by the trained adversarial network, a reliable event instance in the second data set.

In an embodiment, a text-based event detection method includes obtaining a text to be processed, and processing, by processing circuitry of an adversarial network, the text, the adversarial network having been trained using a first data set and a second data set. The first data set includes standard event instances, the second data set includes non-standard event instances, the adversarial network includes a generator and a discriminator. The generator is configured to select event instances from the second data set and input the selected event instances to the discriminator, the discriminator is configured to output first reliable probabilities of the event instances in the first data set, and second reliable probabilities of the event instances inputted by the generator. A loss function of the adversarial network is used to adjust a parameter of the adversarial network, to maximize the first reliable probabilities and minimize the second reliable probabilities. The method further includes obtaining an event corresponding to the text, according to an output result of the discriminator in the adversarial network for the text.

In an embodiment, a training apparatus includes processing circuitry configured to obtain a first data set and a second data, each of the first data set and the second data set includes event instances. The event instances include text and events corresponding to the text, the first data set including standard event instances, and the second data set including non-standard event instances. The processing circuitry is also configured to train an adversarial network using the first data set and the second data set, the adversarial network including a generator and a discriminator, the generator being configured to select event instances from the second data set and input the selected event instances to the discriminator. The discriminator is configured to output first reliable probabilities of the event instances in the first data set, and second reliable probabilities of the event instances inputted by the generator. A loss function of the adversarial network is used to adjust a parameter of the adversarial network, to maximize the first reliable probabilities and minimize the second reliable probabilities. The processing circuitry is further configured to obtain, by the trained adversarial network, a reliable event instance in the second data set.

Details of one or more embodiments of this application are provided in the drawings and descriptions below. Based on the specification, the accompanying drawings, and the claims of this application, features, objectives, and advantages of this application are disclosed.

BRIEF DESCRIPTION OF THE DRAWINGS

To describe the technical solutions in the embodiments of this application, the following briefly introduces the accompanying drawings describing the embodiments. The accompanying drawings in the following description show exemplary embodiments of this application, and a person of ordinary skill in the art may still derive other accompanying drawings from these accompanying drawings.

FIG. 1 is a schematic flowchart of text-based event detection according to an exemplary embodiment.

FIG. 3 is a flowchart of a text-based event detection method according to an exemplary embodiment.

DESCRIPTION OF EMBODIMENTS

Figure 2:
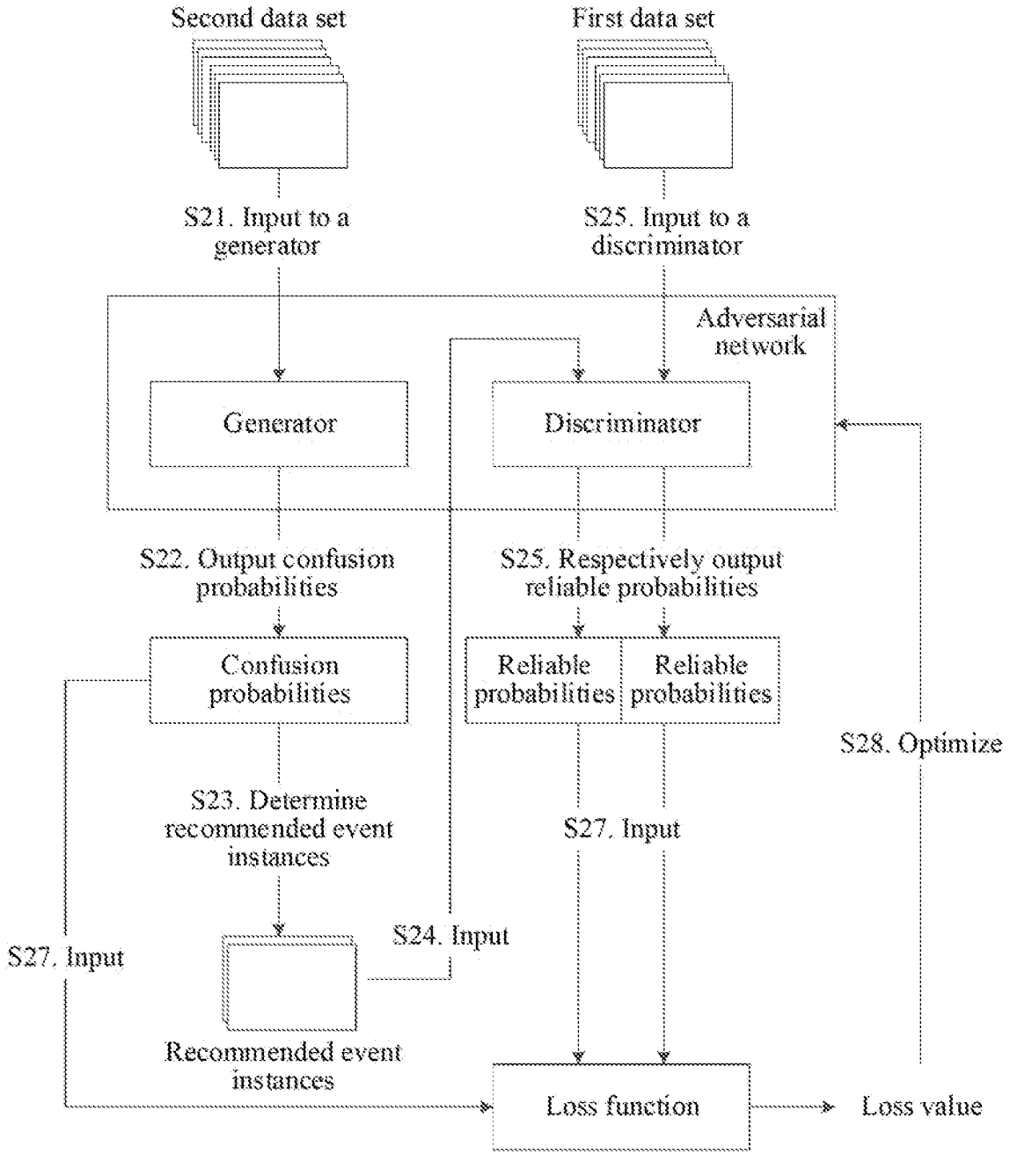
FIG. 2 is a framework diagram of training and application of an adversarial network according to an embodiment shown in FIG. 1.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with this application. On the contrary, the implementations are merely examples of devices and methods that are described in detail in the appended claims and that are consistent with some aspects of this application.

This application provides a text-based event detection solution, which can quickly and accurately obtain reliable event instances from automatically labeled event instances through adversarial training, thereby enabling high efficiency and accuracy event detection. For convenience of understanding, terms in the embodiments of this application are described.

(1) Trigger word: In this application, in the case of a given text including words (which may be words or phrases), the word that can represent an event corresponding to the given text is called the trigger word in the given text.

For example, a given text is "Mark Twain and Olivia Langdon were married in 1870". The event corresponding to the given text is a marriage event, and the trigger word in the given text is "married".

(2) Event detection: In this application, event detection refers to detecting the event trigger word from the given text, and identifying a specific event type of the event trigger word. For example, after extracting the event trigger word "married" from the given text "Mark Twain and Olivia Landon were married in 1870", the event corresponding to the given text is determined to be a marriage event.

The solution of the following embodiments of this application is related to training and application of an adversarial network. FIG. 1 is a schematic flowchart of training for text-based event detection according to an exemplary embodiment. As shown in FIG. 1, the text-based event detection process may be performed by a computer device. The computer device may be a device with a certain computing capability, such as a personal computer, a server, or a workstation. The adversarial network is set up in the computer device by a developer in advance, and includes a generator and a discriminator. When processing the text-based event detection, the computer device performs the following steps:

In Step 11, a first data set and a second data set that respectively include event instances are obtained.

In an embodiment of this application, an event instance includes a text and an event corresponding to the text.

For example, in a case where the text is "Mark Twain and Olivia Langdon were married in 1870", and the event corresponding to the text is a marriage event, then a possible event instance may include the text "Mark Twain and Olivia Langdon were married in 1870" and the "marriage event". The "marriage event" is the label of the text "Mark Twain and Olivia Langdon were married in 1870".

The aforementioned first data set includes standard event instances. A standard event instance refers to an event instance that is accurately labeled, or has no errors or has no noise by default.

The aforementioned second data set includes non-standard event instances. A non-standard event instance refers to an event instance that is inaccurately labeled, or has error labeling or has noisy data by default. The second data set is not limited to only including the non-standard event instances, and may also include the standard event instances. The standard event instances in the second data set can be detected by the method according to the embodiments of this application. Alternatively or additionally, the second data set only includes the non-standard event instances, and in this way a final detection result is that no standard event instance is detected from the second data set.

In an embodiment of this application, the first data set includes accurately labeled event instances (that is, the event instances in the first data set are reliable). The second data set includes accurately labeled event instances and inaccurately labeled events instances (that is, the event instances in the second data set are non-standard). The inaccurately labeled event instances in the second data set may also called noisy data in the second data set.

In Step 12, an adversarial network is trained using the first data set and the second data set. In an embodiment of this application, a generator is used to select an event instance from the second data set and input the event instance to a discriminator. The discriminator is used to output a first reliable probability of an event instance in the first data set, and a second reliable probability of the event instance inputted by the generator. A loss function of the adversarial network is used to adjust a parameter of the adversarial network, so as to maximize the first reliable probability and minimize the second reliable probability.

In Step 13, a standard event instance in the second data set is obtained by a trained adversarial network.

In an embodiment of this application, ater training the aforementioned adversarial network, reliable event instances that are obtained from the second data set by the adversarial network may be added to the first data set, so as to realize automatic expansion of the first data set.

Before the training, the aforementioned adversarial network cannot be used to directly determine which event instances in the second data set are accurately labeled and which event instances are inaccurately labeled; besides, the event instances in the second data set are treated as unreliable by default. The principle of training the adversarial network is to train the generator and the discriminator through multiple iterations of training using the standard and non-standard event instances, continuously adjust the parameters of the generator and the discriminator according to the output results of the generator and the discriminator in each round of training and the preset loss function, and finally enable the discriminator to more accurately determine which event instances in the second data set are accurately labeled and which event instances are inaccurately labeled. After the training of the adversarial network, the trained adversarial network can be used to select the event instances that are accurately labeled from the second data set. The events corresponding to these selected event instances are those detected based on the texts of the event instances.

From above, in the solution according to the embodiments of this application, the generator and the discriminator in the adversarial network are trained using the first data set including the standard event instances and the second data set including the non-standard event instances, so that the trained discriminator can accurately discriminate whether the event instances in the second data set are reliable. On the one hand, this solution requires less amount of manual labeling, which saves the data preparation time, thereby improving the efficiency of the text-based event detection. On the other hand, this solution performs the event detection by the adversarial network, which can accurately eliminate noisy data from the second data set, thereby enhancing the accuracy of the event detection.

In the solution shown in FIG. 1, the generator may output, according to the inputted event instance, a confusion score of the event instance (also called a confusion probability of the event instance) to the discriminator. In this application, the confusion probability is used for indicating the probability that the discriminator incorrectly discriminates whether a corresponding event instance is reliable.

In other words, the aforementioned confusion probability refers to the probability that the discriminator cannot correctly discriminate whether an event instance is accurately labeled. The confusion probability of the non-standard event instance in the second data set outputted by the generator refers to the probability that the event instance will not be accurately labeled by the discriminator. That is to say, the generator aims to recommend the event instances that are most likely to confuse the discriminator from the second data set. The discriminator is configured to discriminate the event instances that are accurately labeled by default (namely the event instances in the first data set), and the event instances that are inaccurately labeled by default and found to have a high confusion probability by the generator.

During recommendation of event instances by the generator, the event instances recommended to the discriminator for discrimination may be determined according to the confusion probability of each event instance outputted by the generator. In addition, during the adversarial training, the parameters of the aforementioned adversarial network may be adjusted according to the loss function, the respective output results of the generator and the discriminator. The above optimization process is effective in optimizing both the generator and the discriminator. That is to say, as the adversarial training progresses, the generator has an increasing capability of accurately selecting the confusing event instances from the second data set, and the discriminator has an increasing capability of accurately discriminating whether the inputted event instances are accurately labeled. The aforementioned adversarial training process may be performed as shown in FIG. 2.

FIG. 2 is a framework diagram of training and application of an adversarial network according to an embodiment shown in FIG. 1. As shown in FIG. 2, the adversarial network that includes the generator and the discriminator is set up in advance. In addition, two data sets, namely the first data set and the second data set, are provided. The first data set includes the event instances in which the events corresponding to the texts are accurately labeled by default, and the second data set includes the event instances in which the events corresponding to the texts are inaccurately labeled by default. In an embodiment, the quantity of the event instances in the first data set may be less than the quantity of the event instances in the second data set.

During the adversarial training, the computer device inputs each event instance in the second data set to the generator (corresponding to step S21 in FIG. 2). The generator outputs the confusion probabilities of the inputted event instances (corresponding to step S22 in FIG. 2), determines the recommended event instances from the second data set according to the confusion probabilities (corresponding to step S23 in FIG. 2), and inputs the recommended event instances to the discriminator (corresponding to step S24 in FIG. 2). In addition, the computer device inputs each event instance in the first data set to the discriminator (corresponding to step S25 in FIG. 2). The discriminator respectively outputs the reliable probabilities of the recommended event instances and the event instances in the first data set (corresponding to step S26 in FIG. 2). The computer device inputs the confusion probabilities outputted by the generator and the reliable probabilities outputted by the discriminator to the loss function (corresponding to step S27 in FIG. 2), and optimizes the parameters of the adversarial network according to the loss value outputted by the loss function (corresponding to step S28 in FIG. 2). The above steps may be repeated until the output result of the discriminator is converged (for example, the output result of the discriminator no longer changes significantly), then the training of the adversarial network is considered to be completed. The trained adversarial network may be used to obtain the reliable event instance from the second data set. The obtained reliable event instance includes the event corresponding to the text, namely the event detected based on the text. The recommended event instances are the event instances that are selected for input to the discriminator.

In the solution shown in FIG. 1 and FIG. 2, the first data set and the second data set may be quickly and automatically labeled on a large scale according to a preset rule or through weak supervision.

FIG. 3 is a flowchart of a training method for text-based event detection according to an exemplary embodiment. The text-based event detection method is applicable to a computer device, in order to train the adversarial network shown in FIG. 2 and perform the event detection. As shown in FIG. 3, the text-based event detection method may include the following steps:

In Step 301, a first data set and a second data set that respectively include event instances are obtained.

The event instances include text and events corresponding to the text. The first data set includes standard event instances, and the second data set includes non-standard event instances.

The event detection solution according to this application may be applied in scenarios of weakly supervised learning, such as a semi-supervised scenario or a distant supervision scenario.

In the semi-supervised scenario, the computer device may first obtain the first data set, and obtain an event labeling rule according to the first data set, the event labeling rule including a correspondence between events of standard instances and trigger words in texts of the standard instances, the standard instance being the event instances in the first data set. The computer device may label each text other than the first data set according to the event labeling rule, to obtain a candidate data set, and pre-train the discriminator using the first data set, to obtain a pre-trained discriminator. The computer device may further process each event instance in the candidate data set by the pre-trained discriminator, to obtain the reliable probability of each event instance in the candidate data set; and extract the second data set from the candidate data set according to the reliable probability of each event instance in the candidate data set.

In an embodiment, in the semi-supervised scenario, when the computer device obtains the first data set, the first data set may be manually labeled.

That is to say, in an embodiment of this application, when the adversarial training strategy is adjusted for the semi-supervised scenario, the discriminator may be pre-trained using small-scale labeled data (namely the first data set), so as to enable the discriminator to detect the event trigger words in the text and identify the event types to a certain extent. Based on a potential instance discovery strategy, a large-scale candidate set is constructed by using the trigger words in the small-scale labeled data as heuristic seeds (namely, corresponding to the aforementioned event labeling rule). Then, the pre-trained discriminator is used to automatically discriminate the trigger words and the event types of all the instances in the candidate set, thereby constructing a large-scale data set with noise. The small-scale labeled data is regarded as a reliable set R (namely the first data set), and the large-scale automatically labeled data is regarded as an unreliable set U (namely the second data set).

The aforementioned potential instance discovery strategy based on trigger words is a simple strategy based on trigger words provided by this application in order to make use of unlabeled data. This strategy can automatically label the trigger words and the event types of the raw data.

The aforementioned strategy based on trigger words is based on a heuristic hypothesis. That is, if a given word is served as an event trigger word in a known instance, all other instances where this word is mentioned in the unlabeled data are the potential instances that indicate the event. For example, the word "married" in "Mark Twain and Olivia Langdon were married in 1870" is served as the trigger word to indicate the event "marriage". Based on this, all texts including the word "married" in the unlabeled data may be added to the potential instance candidate set along with the event "marriage".

The potential instance discovery strategy based on trigger words provided in the embodiments of this application is relatively concise, with no need to consider the correlation between words, trigger words, and event types. In addition, since the above potential instance discovery strategy is less restrictive, it is possible to efficiently obtain the large-scale candidate set without relying on special manual design, and also enable the candidate set to cover more instances and topics.

In the distant supervision scenario, when obtaining the first data set and the second data set that respectively include event instances, the computer device may label each text according to a preset event labeling rule, so as to obtain an initial data set, the event labeling rule including the correspondence between the events and the trigger words. The computer device may pre-train the discriminator using the initial data set, and process each event instance in the initial data set by the pre-trained discriminator, to obtain the reliable probability of each event instance in the initial data set. The computer device may further obtain the first data set and the second data set from the initial data set according to the reliable probability of each event instance in the initial data set.

In an embodiment, when obtaining the first data set and the second data set from the initial data set according to the reliable probability of each event instance in the initial data set, the computer device may add each event instance in the initial data set whose reliable probability is higher than a first probability threshold to the first data set, and add each event instance in the initial data set whose reliable probability is not higher than the first probability threshold to the second data set.

The adaptation strategy for the distant supervision scenario is similar to that for the semi-supervised scenario. For example, all the automatically labeled data (which is not all accurate) may be first used to pre-train the discriminator. The discriminator is used to calculate the reliable scores (namely the reliable probabilities) of all the event instances in the automatically labeled data. Then, the automatically labeled data may be divided into two parts by setting a specific threshold. The event instances with scores higher than the threshold are added to the reliable set R (namely the first data set), and the other event instances with lower scores are added to the unreliable set U (namely the second data set). The reliable set R may be used as a seed, and in this way more labeled data can be obtained based on the potential instance discovery strategy based on trigger words in the aforementioned semi-supervised scenario.

Figure 4:
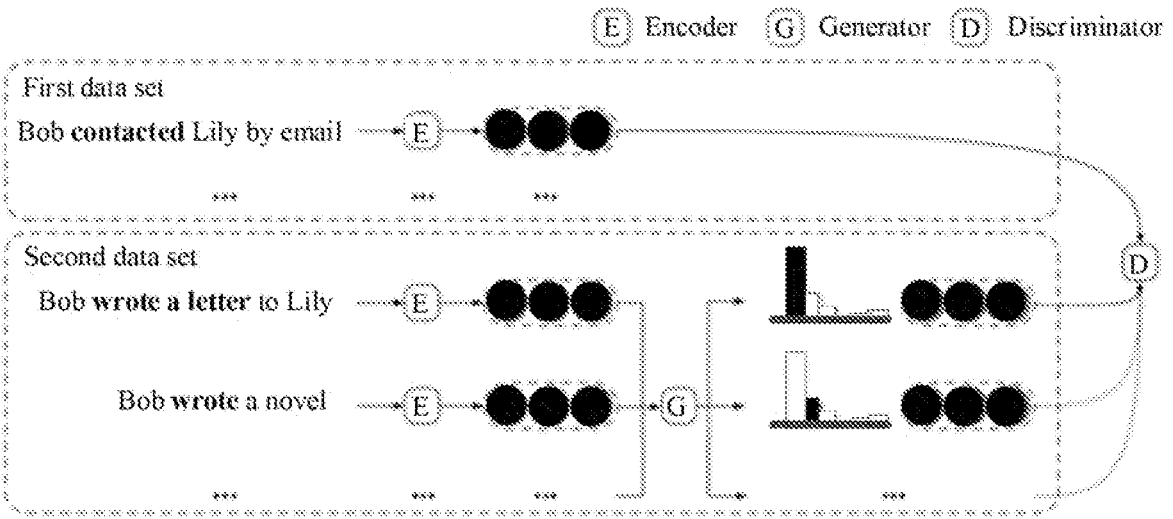
FIG. 4 is an overall framework diagram of an adversarial strategy according to an embodiment shown in FIG. 3.

The first data set and second data set after being obtained may be used to train the adversarial network. FIG. 4 is an overall framework diagram of an adversarial strategy according to an embodiment. As shown in FIG. 4, the overall framework of the adversarial strategy provided in an embodiment of this application includes the discriminator and the generator. The discriminator is used to detect the event trigger words and identify the event types of the instances in the data set. In a case of noisy data, the discriminator needs to resist the noise, and explicitly gives that there is no trigger word and event. The generator is used to select instances from the unreliable data set U (namely the aforementioned second data set), in order to confuse the discriminator as much as possible.

Assume that each event instance in the first data set $x \epsilon R$ explicitly indicates its tagged trigger word t and event type e. On the contrary, during the adversarial training, it is assumed that each instance in the second data set $x \epsilon U$ is unreliable, that is, there is a certain probability that each instance is incorrectly labeled. Thus, in an embodiment of this application, the predesigned discriminator is used to determine whether a given event instance can indicate its labeled event type, so as to maximize a conditional probability $P(e|x, t)$, $x \epsilon R$ and $1-P(e|x, t)$, $x \epsilon U$, x is information about the instance, t is information about the trigger word, e is the tagged event type, $P(e|x, t)$ is the probability that the instance and the trigger word can indicate the corresponding event type e, and $1-P(e|x, t)$ is the probability that the instance and the trigger word cannot indicate the corresponding event type e.

The generator is trained to select most confusing event instances from the unreliable data set U (namely the second data set) for deceiving the discriminator, namely selecting the event instances according to $P(e|x, t)$, $x \epsilon U$. The above training process is an adversarial max-min game process, which may be defined as follows:

$$\varphi_D = \max(E_{X-P_R}[\log(P(e|x,t))] + E_{X-P_U}[\log(1-P(e|x,t))],$$

$$\varphi_G = \max(E_{X-P_u}[\log(P(e|x,t))]);$$ (1)

where E is a symbol of mathematical expectation, and $E_{X-P_U}$ refers to the expectation of a random variable x that follows a $P_u$ distribution.

$P_R$ is the distribution of the reliable data, and the generator samples adversarial instances from the unreliable data according to the probability distribution $P_u$. Although $\varphi_D$ and $\varphi_G$ are contradictory to each other, the noisy data in U has side effects on both $\varphi_D$ and $\varphi_G$. Thus, when the generator and the discriminator reach a balance after fully training, the generator tends to select an informative instance with a higher probability than a noisy instance, and the discriminator has stronger resistance to noise and thus can classify events better.

In addition to the generator and the discriminator described in the embodiments shown in FIG. 1 and FIG. 2, the adversarial network further includes an encoder. The encoder is used to encode an event instance into an embedding vector, so as to facilitate the processing of the generator and discriminator. The parameters of the encoder also need to be optimized during the adversarial training.

Correspondingly, the obtaining of the first data set and the second data set involves the process of pre-training the discriminator. Thus, during the pre-training process, the encoder also needs to be pre-trained, so as to help the discriminator to process the event instances.

In step 302, each event instance in the first data set and the second data set is encoded by the encoder during each round of adversarial training, to obtain an embedding vector of each event instance in the first data set and the second data set.

The embedding vector is used for indicating each word in the text corresponding to the event instance, and a positional relation between words.

The encoder in an embodiment of this application is used to encode the event instance into its corresponding embedding vector, in order to provide semantic features for other modules (namely the generator and discriminator) in the adversarial network. For example, suppose that an instance $x=(w1, \ldots, t, \ldots, wn)$ including n words and its candidate trigger word t, the embedding vector can be obtained by an embedding layer. In an embodiment of this application, several effective neural network models may be used to encode the event instance.

For example, in an embodiment of this application, an encoder based on Convolutional Neural Networks (CNN) or an encoder based on Bidirectional Encoder Representation from Transformers (BERT) may be adopted as the encoder for encoding the given event instances. The principles of the two encoders are as follows.

1) In the CNN-based encoder, all words in the event instance are represented as an input vector, the input vector including a word embedding vector and a position embedding vector, positions relative to the candidate trigger word are encoded, and the CNN-based encoder slides a convolution kernel on the input vector to obtain a hidden embedding vector as follows:

$$\{h1, \ldots, hn\} = CNN(w1, \ldots, t, \ldots, wn) \qquad (2)$$

2) In the BERT-based encoder, similar to the CNN-based encoder, after summing a word segment vector and a position embedding vector of all words in the event instance as an input vector, the BERT-based encoder uses a multi-layer bidirectional transformer encoder to obtain a hidden embedding vector as follows:

$$\{h1, \ldots, hn\} = BERT(w1, \ldots, t, \ldots, wn) \qquad (3)$$

where the candidate trigger word t divides the words in the event instance x into two parts. In an embodiment of this application, dynamic multi-pooling operation is further performed on the hidden embedding vector to obtain the embedding vector x of the event instance:

$$[\bar{x}]_j = \max\{[h1]_j, \ldots, [hi]_j\}, [\vec{x}]_j = \max\{[h_{i+1}]_j \ldots, [hn]_j\}; \qquad (4)$$

where $x = [\bar{x}]_j + [\vec{x}]_j$;

In the above formula, $[\cdot]_j$ denotes the j-th dimension value of the vector, and i denotes the position of the trigger word t.

The aforementioned CNN-based encoder with the dynamic multi-pooling may be called a dynamic multi-pooling CNN encoder. Correspondingly, the aforementioned BERT-based encoder with the dynamic multi-pooling may be called a dynamic multi-pooling BERT encoder.

In step 303, the embedding vector of each event instance in the second data set by the generator is processed, to obtain a confusion probability of each event instance in the second data set.

In an embodiment of this application, the generator aims to select most confusing event instances from U to deceive the discriminator. Thus, an embodiment of this application designs the generator to optimize the probability distribution $P_u$, so as to select the event instances. That is, the generator calculates the confusion score of each instance in U, evaluates the confusion degree of each instance, and further calculates the confusion probability $P_u$ as follows:

$$f(x) = W \cdot x + b; \qquad (5)$$

$$P_u(x) = \frac{\exp(f(x))}{\Sigma \hat{X} \in U \ \exp(f(\hat{x}))};$$

where x is the embedding vector of the event instance x calculated by the encoder, and W and b are the parameters of a hyperplane.

In step 304, second event instances from the second data set are recommended according to the confusion probability of each event instance in the second data set.

In an embodiment of this application, after the generator outputs the confusion probability of each event instance in the second data set, the computer device may recommend the second event instances from the second data set according to the confusion probabilities. For example, the computer device may sort the event instances in the second data set according to an order of the confusion probabilities from high to low, and obtain at least one event instance ranked at the front of the sequence as the recommended second event instance.

Alternatively or additionally, in another possible manner, the computer device may obtain event instances whose confusion probabilities are higher than a confusion probability threshold from the event instances in the second data set as the recommended second event instances.

The aforementioned confusion probability threshold may be preset by a developer. Alternatively or additionally, the aforementioned confusion probability threshold may be determined by the computer device according to the confusion probability of each event instance in the second data set.

In step 305, the embedding vectors of first event instances and the second event instances are processed by the discriminator, to obtain the reliable probabilities of the first event instances and the second event instances.

The first event instances are the event instances in the first data set.

In an embodiment of this application, in a case of a given event instance x and its labeled trigger word t and event type e, the discriminator is responsible for determining whether the given event instance correctly corresponds to its labeled trigger word and event type. After representing the event instance x into the embedding vector x, the discriminator may be implemented as follows:

$$D(e \mid x, t) = e \cdot x; \tag{6}$$

$$P(e \mid x, t) = \frac{\exp(D(e \mid x, t))}{\Sigma_{\hat{e} \in \mathcal{E}} \exp(D(\hat{e} \mid x, t))}$$

where e is the embedding vector of the event type e∈E, and P(e|x,t) denotes the reliable probability of the event instance x.

In an embodiment of this application, in addition to processing the second event instances recommended by the generator, so as to output the reliable probabilities of the second event instances, the discriminator also processes the first event instances in the first data set, so as to output the reliable probabilities of the first event instances.

In an embodiment, before processing the embedding vector of each event instance in the second data set by the generator, the computer device may sample the second data set to obtain each event instance in the second data set. Correspondingly, before processing the respective embedding vectors of the first event instances and the second event instances by the discriminator, the computer device may sample the first data set to obtain the first event instances.

Since the first data set and the second data set may include a large number of event instances, performing the aforementioned steps 303 to 305 for each event instance is time-consuming. Thus, in an embodiment of this application, during each round of the adversarial training, the first data set and the second data set may be respectively sampled (for example, in a uniform random manner), so as to obtain a subset of the first data set and a subset of the second data set. The subsequent steps are performed based on the subset of the first data set and the subset of the second data set obtained by sampling.

The aforementioned sampling on the first data set may be performed before step 302 or step 305. The aforementioned sampling on the second data set may be performed before step 302 or step 303.

In step 306, a loss value is calculated according to a loss function, an output result of the generator (the obtained confusion probability of each event instance in the second data set), and an output result of the discriminator, if the output result of the discriminator is not converged.

In an embodiment of this application, if the output result of the discriminator has a small change relative to the output result of the previous round or rounds, for example, the difference between the output results is less than a preset difference threshold, it may be considered that the output result of the discriminator is converged, and accordingly the training of the adversarial network is completed. Correspondingly, if the output result of the discriminator has a large change relative to the output result of the previous round or rounds, for example, the difference between the output results is not less than the preset difference threshold, it may be considered that the output result of the discriminator is not converged, and accordingly the parameters of the adversarial network need to be optimized. That is, the loss value is calculated according to the loss function, the output result of the discriminator, and the output result of the generator.

In step 307, a parameter of the adversarial network is adjusted according to the loss value.

In an embodiment, the loss function includes a first loss function. When calculating the loss value according to the loss function, the output result of the generator, and the output result of the discriminator, the computer device may calculate a first loss value according to the first loss function, the first reliable probabilities of the first event instances, the second reliable probabilities of the second event instances, and the confusion probabilities of the second event instances.

Correspondingly, when adjusting the parameters of the adversarial network according to the loss value, the computer device may adjust the parameters of the encoder and the discriminator according to the first loss value.

In an embodiment of this application, the optimized discriminator gives high scores (namely outputting high reliable probabilities) for those event instances in R (namely the first data set); but does not trust the event instances and labels in U (namely the second data set), namely outputting low reliable probabilities for the event instances in U. Thus, the loss function may be formalized as follows to optimize the discriminator:

$$\mathcal{L}_D = -\Sigma_{x \in R} \frac{1}{|R|} \log(P(e \mid x, t)) - \Sigma_{x \in U} \; P_U(x) \log(1 - P(e \mid x, t)) \tag{7}$$

When the discriminator is optimized, the encoder part and D(e|x,t) may be regarded as the updated parameters. The loss function $\mathcal{L}_D$ corresponds to $\varphi_D$ in equation (1).

In another possible implementation, the loss function includes a second loss function. When calculating the loss value according to the loss function, the output result of the generator, and the output result of the discriminator, the computer device may calculate a second loss value according to the second loss function, the second reliable probabilities of the second event instances, and the confusion probabilities of the second event instances.

Correspondingly, when adjusting the parameters of the adversarial network according to the loss value, the computer device may adjust the parameters of the generator according to the second loss value.

In an embodiment of this application, the higher the confusion probability of an event instance outputted by the generator is, the more confusing the event instance is, which means that the discriminator is more likely to be deceived and make an incorrect determination. In the solution according to this application, the optimized generator is made to pay attention on those most confusing event instances. Thus, given an instance x∈U, and its unreliable trigger word t and event type e, the loss function may be formalized as follows to optimize the generator:

$$\mathcal{L}_G = -\Sigma_{x \in U} P_u(x) \log(P(e \mid x, t)) \tag{8}$$

where P(e|x,t) denotes the output result (namely the confusion probability) calculated by the discriminator. When the generator is optimized, the calculation of $P_u(x)$ is treated as the parameter that needs to be updated. The loss function $\mathcal{L}_G$ corresponds to $\varphi_G$ in equation (1).

In an embodiment, when calculating the second loss value according to the second loss function, the second reliable probabilities of the second event instances, and the confusion probabilities of the second event instances, the computer device may obtain an average reliable probability of the second event instances according to the second reliable probabilities of the second event instances, and then calculate the second loss value according to the second loss function, the average reliable probability, and the confusion probabilities of the second event instances.

U (namely the second data set) may include event instances that do not have corresponding event types, namely NA, and these event instances may be incorrectly classified into other event types. Thus, in order to further improve the accuracy of training the generator, an embodiment of this application may use an average score of all event types to replace P(e|x, t) in equation (8) as follows:

$$P(NA \mid x, t) = \frac{1}{|\varepsilon| - 1} P(e \mid x, t), \tag{9}$$

where ε denotes a group of event types.

In an embodiment, when calculating the loss value according to the loss function, the output result of the generator, and the output result of the discriminator, the computer device may sample the first event instances to obtain first sampling instances; sample the second event instances to obtain second sampling instances; and calculate the loss value according to the loss function, the output result of the generator for the second sampling instances, and output results of the discriminator respectively for the first sampling instances and the second sampling instances.

Since R and U may include a large number of instances, it is very time-consuming to directly calculate $\mathcal{L}_G$ and $\mathcal{L}_D$. In order to improve the training efficiency, an embodiment of this application estimates the basic probability distribution by sampling the subsets of R and U, and generates a new loss function:

$$\tilde{\mathcal{L}}_D = -\sum_{x \in \tilde{R}} \frac{1}{|\tilde{R}|} \log(P(e \mid x, t)) - \sum_{x \in \tilde{U}} P_{\tilde{U}}(x)\log(1 - P(e \mid x, t)) \tag{10}$$

$$\tilde{\mathcal{L}}_G = -\Sigma_{x \in \tilde{U}}\, P_{\tilde{U}}(x)\log(P(e \mid x, t))$$

where $\tilde{R}$ and $\tilde{U}$ are the subsets sampled from U and R, and $P_{\tilde{U}}$ is an estimated value of formula (6).

$$P_{\tilde{U}}(x) = \frac{\exp(f(x)^\alpha)}{\Sigma \hat{x} \in \tilde{U}\, \exp(f(\hat{x})^\alpha)} \tag{11}$$

where α is a hyperparameter, which is used to control the sharpness of the probability distribution, so as to avoid weights from being concentrated on some specific instances. Finally, the overall optimization function is:

$$\mathcal{L} = \mathcal{L}_D + \lambda \mathcal{L}_G \tag{12}$$

where λ is a harmonic factor, $\mathcal{L}_D$ and $\mathcal{L}_G$ may be alternately optimized during the adversarial training, and λ is reflected in the learning rate of $\mathcal{L}_G$.

The above sampling may be performed before the event instances in the first data set and the second data set are processed by the encoder, the generator, and the discriminator. That is, the encoder, the generator, and the discriminator process the sampled event instances, and subsequently the loss value is calculated according to the output results of the sampled event instances.

Alternatively or additionally, the above sampling may be performed after the event instances in the first data set and the second data set are processed by the encoder, the generator, and the discriminator. That is, all the event instances in the first data set and the second data set are processed by the encoder, the generator, and the discriminator, the sampling is performed, and after the sampling, the loss value is calculated by the generator and the discriminator according to the output results of the sampled event instances.

In an embodiment, the hyperparameters of the aforementioned generator and discriminator may be set as shown in Table 1 below:

TABLE 1

| | |
|---|---|
| Drop probability of dropout | $5 \times 10^{-1}$ |
| Learning rate of the generator using the dynamic multi-pooling CNN as the encoder | $5 \times 10^{-3}$ |
| Learning rate of the discriminator using the dynamic multi-pooling CNN as the encoder | $2 \times 10^{-2}$ |
| Learning rate of the generator using the dynamic multi-pooling BERT as the encoder | $2 \times 10^{-5}$ |
| Learning rate of the thscriminator using the dynamic multi-pooling BERT as the encoder | $1 \times 10^{-4}$ |

In step 308, a target event instance in the second data set recommended by the trained generator is added to the first data set, in response to a determination that the reliable probability of the target event instance outputted by the trained discriminator is higher than a first probability threshold.

During the adversarial training, as the discriminator and the generator reach a balance after a certain number of training rounds, all instances in the unreliable set U that are recommended by the generator and labeled as correct by the discriminator are adjusted from U to R. Iterative adversarial training can identify information-rich instances and filter out noisy instances in U, thereby enriching small-scale labeled data by using large-scale unlabeled data.

Figure 5:
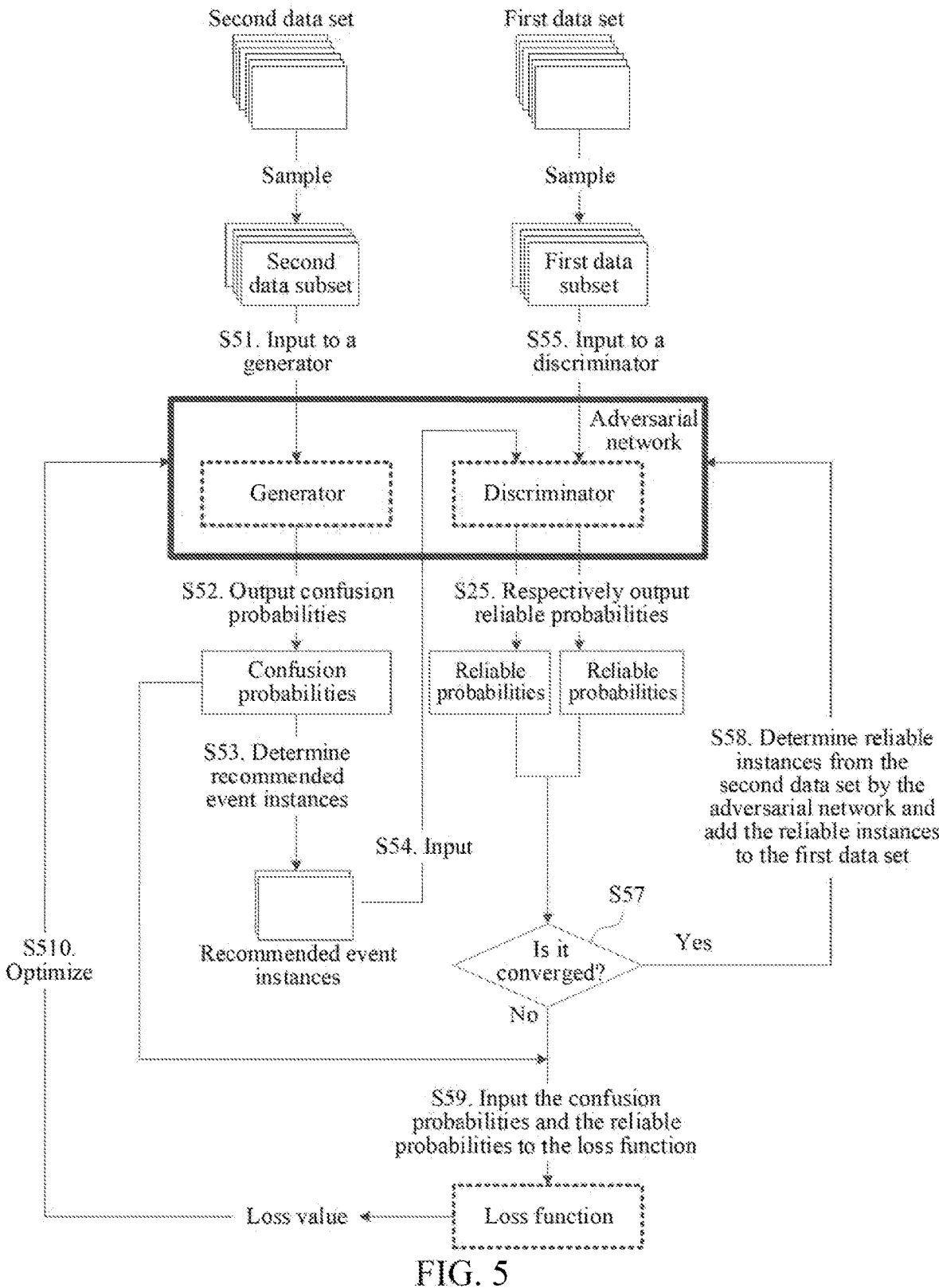
FIG. 5 is a framework diagram of training and application of an adversarial network according to an embodiment shown in FIG. 3.

FIG. 5 is a framework diagram of training and application of an adversarial network according to an embodiment. As shown in FIG. 5, the computer device obtains the first data set and the second data set. The obtaining of the first data set and the second data set may refer to the description below step 301, thus will not be detailed herein. During a round of the adversarial training, the computer device samples the event instances in the second data set to obtain a second data subset, and inputs the second data subset to the generator (S51). The generator outputs the confusion probabilities of the inputted event instances (S52), determines the recommended event instances from the second data subset according to the confusion probabilities (S53), and inputs the recommended event instances to the discriminator (S54). Besides, the computer device samples the first data set to obtain a first data subset set, and inputs each event instance in the first data subset to the discriminator (SS5). The discriminator respectively outputs the reliable probabilities of the recommended event instances and the reliable probabilities of the event instances in the first data subset (S56). The computer device determines whether the convergence is reached according to the output of the discriminator (S57). If yes, the computer device recommends and discriminates each event instance in the second data set by the adversarial network, so as to determine reliable event instances from the second data set and add the reliable event instances to the first data set (S58). If no, the computer device inputs the confusion probabilities outputted by the generator and the reliable probabilities outputted by the discriminator into the loss function (S59), optimizes the parameters of the adversarial network according to the loss value outputted by the loss function (S510), and performs the next round of the adversarial training.

Figure 6:
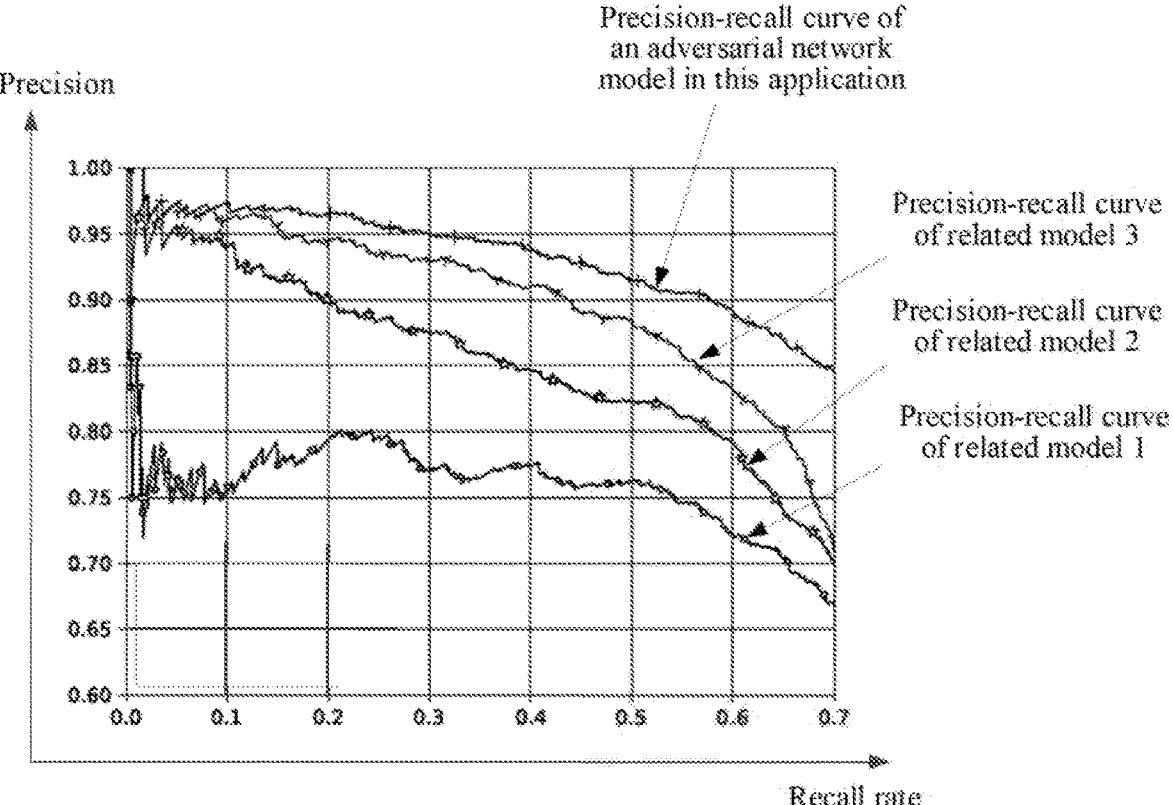
FIG. 6 and FIG. 7 are schematic diagrams of comparisons of two kinds of precision-recall curves according to an embodiment shown in FIG. 3.
Figure 7:
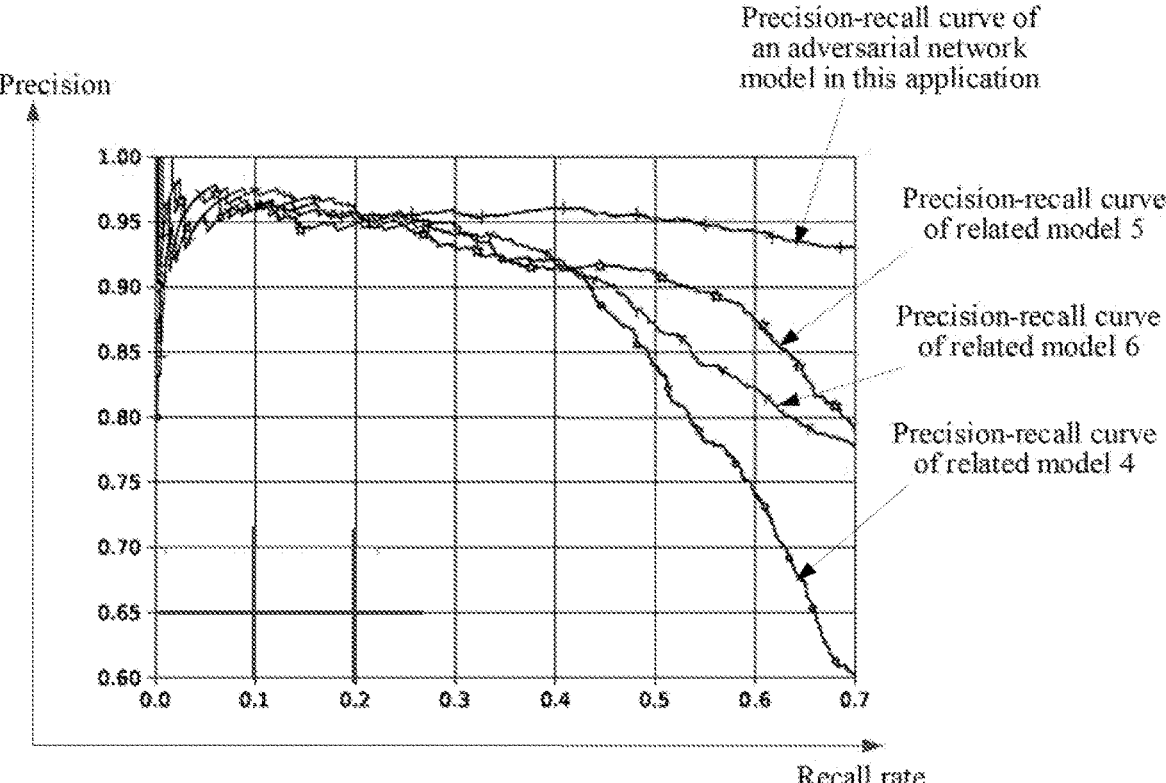

FIG. 6 and FIG. 7 are schematic diagrams of comparisons of two kinds of precision-recall curves in the distant supervision scenario according to an embodiment in this application.

FIG. 6 shows a schematic diagram of precision-recall curves of the adversarial network model using the dynamic multi-pooling CNN as the encoder provided in this application, and three weakly supervised models using the dynamic multi-pooling CNNs as the encoders (namely related model 1, related model 2, and related model 3) in the related technology in application of the text-based event detection.

FIG. 7 shows a schematic diagram of precision-recall curves of the adversarial network model using the dynamic multi-pooling BERT as the encoder provided in this application, and three weakly supervised models using the dynamic multi-pooling BERTs as the encoders (namely related model 4, related model 5, and related model 6) in the related technology in application of the text-based event detection.

Based on the above FIG. 6 and FIG. 7, a comparison table of areas under curves (AUC) of the adversarial network model provided in this application and the weakly supervised models in the related technology in the case of different encoders can be obtained. The comparison table is shown in Table 2 below:

TABLE 2

| Model | AUC | |
| | Micro-average | Macro-average |
|---|---|---|
| Related model 1 | 67.6 | 38.7 |
| Related model 2 | 75.7 | 43.3 |
| Related model 3 | 70.6 | 25.8 |
| Adversarial network model using the dynamic multi-pooling CNN as the encoder | 85.5 | 50.7 |
| Related model 4 | 70.6 | 42.2 |
| Related model 5 | 79.4 | 47.3 |
| Related model 6 | 74.0 | 38.6 |
| Adversarial network model using the dynamic multi-pooling BERT as the encoder | 91.5 | 67.6 |

It can be seen from Table 2 that, in the distant supervision scenario, the two adversarial networks based on different encoders provided in the embodiments of this application are significantly better than other weakly supervised models based on the two encoders in the related technology.

For the semi-supervised scenario, an embodiment of this application uses the known trigger words in a raw training set (such as the ACE-2005 training set) as the heuristic seeds, to construct a large-scale candidate set from a corpus (such as the "New York Times" corpus) based on the above-mentioned potential instance discovery strategy based on trigger words. The embodiment of this application trains the adversarial network, and uses the trained adversarial network to filter out noise instances, so as to construct a new data set. The embodiment of this application extends the raw training set using the new data set, to obtain an extended training set, and tests the adversarial network trained on the extended training set on the raw test set. The adversarial network model that uses the dynamic multi-pooling CNN as the encoder and is trained using the extended training set is CNN model 2. The adversarial network model that uses the dynamic multi-pooling BERT as the encoder and is trained using the raw training set is BERT model 1, and the adversarial network model that uses the dynamic multi-pooling BERT as the encoder and is trained using the extended training set is BERT model 2. The above-mentioned CNN model 2, BERT model 1, and BERT model 2 are compared with the weakly supervised models (related models 7 to 15) trained using the ACE-2005 training set in the related technology, and a comparison result is shown in Table 3.

TABLE 3

| Model | Performance | | |
| | P | R | F1 |
|---|---|---|---|
| Related model 7 | 73.7 | 62.3 | 67.5 |
| Related model 8 | 75.6 | 63.6 | 69.1 |
| Related model 9 | 66.0 | 73.0 | 69.3 |
| Related model 10 | 77.6 | 65.2 | 70.7 |
| Related model 11 | 77.2 | 64.9 | 70.5 |
| Related model 12 | 78.9 | 66.9 | 72.4 |
| Related model 13 | 75.7 | 66.0 | 70.5 |
| Related model 14 | 71.3 | 74.4 | 73.0 |
| Related model 15 | 77.9 | 68.8 | 73.1 |
| BERT model 1 | 77.6 | 71.8 | 74.6 |
| CNN model 2 | 77.7 | 65.1 | 70.8 |
| BERT model 2 | 77.9 | 72.5 | 75.1 |

In the above Table 3, the P column represents the precision rate, the R column represents the recall rate, and the F1 column represents the harmonic mean of the precision rate and the recall rate. It can be seen from Table 3 that the solution provided in this application can be used to construct a high-quality data set without complicated rules and a large-scale knowledge base, and can effectively collect different event instances, which is beneficial for the training of the model. In addition, this application can obtain better model performance by adding training data, thereby proving the effectiveness of the adversarial network model provided in this application.

In order to perform a fine-grained evaluation of the quality of the data set constructed based on the instance discovery strategy based on trigger words and the adversarial training strategy provided by the embodiments of this application, as shown in Table 4, this application evaluates the weakly supervised models (related model 16 and related model 17) in the related technology and the model of this application by using the average precision and the Fleiss's Kappa coefficient.

TABLE 4

| Model | Average precision | Fleiss's Kappa |
|---|---|---|
| Related model 16 | 88.9 | — |
| Related model 17 | 91.0 | — |
| First iteration of the model of this application | 91.7 | 61.3 |
| Second iteration of the model of this application | 87.5 | 52.0 |

It can be seen from Table 4 that the instance discovery strategy based on trigger words and the adversarial training strategy provided in the embodiments of this application can extract event instances with high precision.

To further prove that the model of this application can effectively improve the coverage of the data set, an embodiment of this application provides results shown in Table 5.

TABLE 5

| Event type: Trial Subtype: Prosecution | |
| --- | --- |
| ACE-2005 instance | Dell was prosecuted for "baiting" and false promises. |
| Extended instances | 1. The lawyer of four prosecuted former state government officials told jurors . . . |
| | 2. However, the lawsuit delayed the project until . . . |

The ACE-2005 instance is a typical event instance in the ACE-2005 training set corresponding to a prosecution event. Two instances in the extended instances are event instances sampled from the data set constructed by the solution of this application. In the extended instances, the first event instance has the same trigger word as the ACE-2005 instance, but the trigger word has different semantics in the two instances; the second event instance has a new trigger word that is not included in the ACE-2005 instance. Experiments show that in the extended data set constructed by the solution of this application, 1.2% of the trigger words are newly discovered. This indicates that the method according to this application can not only find new instances from unlabeled data similar to the instances in the labeled data, but also discover new trigger words, thereby extending the coverage of the data set.

The aforementioned trained adversarial network provided in the embodiments of this application can perform event detection on the text of the event instances in the second data set, so as to extend the first data set, thereby obtaining a larger-scale data set with high quality for facilitating the training of other models. Besides, it can be directly applied to scenarios where events are automatically detected from other unlabeled texts.

For example, in an embodiment, the discriminator in the adversarial network can predict an event corresponding to an inputted text. A recognition device (such as an online server) that is deployed with the above trained adversarial network may obtain a to-be-recognized text (such as a natural language sentence), process the to-be-recognized text by the trained adversarial network, and obtain the event corresponding to the to-be-recognized text according to the output result of the discriminator in the adversarial network for the to-be-recognized text, thereby realizing the event detection of the to-be-recognized text.

From above, in the solution according to the embodiments of this application, the generator and the discriminator in the adversarial network are trained using the first data set including the standard event instances and the second data set including the non-standard event instances, so that the trained discriminator can accurately discriminate whether the event instances in the second data set are reliable. On the one hand, this solution requires less amount of manual labeling, which saves the data preparation time, thereby improving the efficiency of the text-based event detection. On the other hand, this solution performs the event detection by the adversarial network, which can accurately eliminate noisy data from the second data set, thereby enhancing the accuracy of the event detection.

Specifically, the embodiments of this application provide an adversarial training mechanism, which can not only automatically extract more informative instances from the candidate set, but also improve the performance of the event detection model in noisy data scenarios (such as the distant supervision scenario). As indicated by experiments in the semi-supervised scenario and the distant supervision scenario, in the solution of this application, the potential instance discovery strategy based on trigger words and the adversarial training approach can be cooperated, to obtain more diverse and accurate training data, and reduce the side effect of noise problem, thus being significantly better than the state-of-the-art event detection model. That is, this application provides a new weakly-supervised event detection model, which can extend the data set for enabling a higher coverage, and alleviate the problems of low coverage, topic deviation and noise during the event detection, thereby improving the effect of the event detection.

The training and application solution of the adversarial network according to the embodiments of this application may be applied to artificial intelligence (AI) scenarios where the event detection is performed based on the text and subsequent applications are performed based on the detected event. For example, the training and application solution of the adversarial network according to the embodiments of this application can automatically identify the corresponding event from the text described in natural language by AI, and then provide AI services, such as intelligent question answering, information retrieval, and reading comprehension, based on the identified event.

In a possible implementation scenario, the adversarial network according to the embodiments of this application may be applied to a service system based on natural language. For example, the service system based on natural language may be deployed with the trained adversarial network, and provide an external service interface. In response to a user accepting a service, such as an intelligent question answering service, provided by the service system, the user's terminal may transmit natural language to the service system through the service interface. The service system generates a corresponding sentence text based on the natural language, detects the event corresponding to the sentence text by the adversarial network, and subsequently provides the user with the intelligent question answering service based on the detected event.

Alternatively or additionally, in another possible implementation scenario, the adversarial network according to the embodiments of this application may be independently deployed as an event detection system. For example, the event detection system deployed with the trained adversarial network may provide an external service interface. A service system based on natural language, such as an intelligent question answering system, receives natural language transmitted by a user's terminal, generates the corresponding sentence text based on the natural language, and transmits the sentence text to the event detection system through the service interface. The event detection system detects the event corresponding to the sentence text by the adversarial network, and transmits the detected event to the service system, so that the service system can provide the user with the intelligent question answering service according to the detected event.

This application is merely illustrated by the example of the service system providing users with the intelligent question answering service. In an embodiment, the aforementioned service system may provide users with other services based on the event detected from the text, such as retrieval or reading comprehension.

It is to be understood that, although the steps are displayed sequentially according to the instructions of the arrows in the flowcharts of the embodiments, the steps are not necessarily performed sequentially according to the sequence instructed by the arrows. Unless otherwise explicitly specified in this specification, execution of the steps is not strictly limited in sequence, and the steps may be performed in other sequences. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed alternately with other steps or at least some of sub-steps or stages of other steps.

Figures 8, 9:
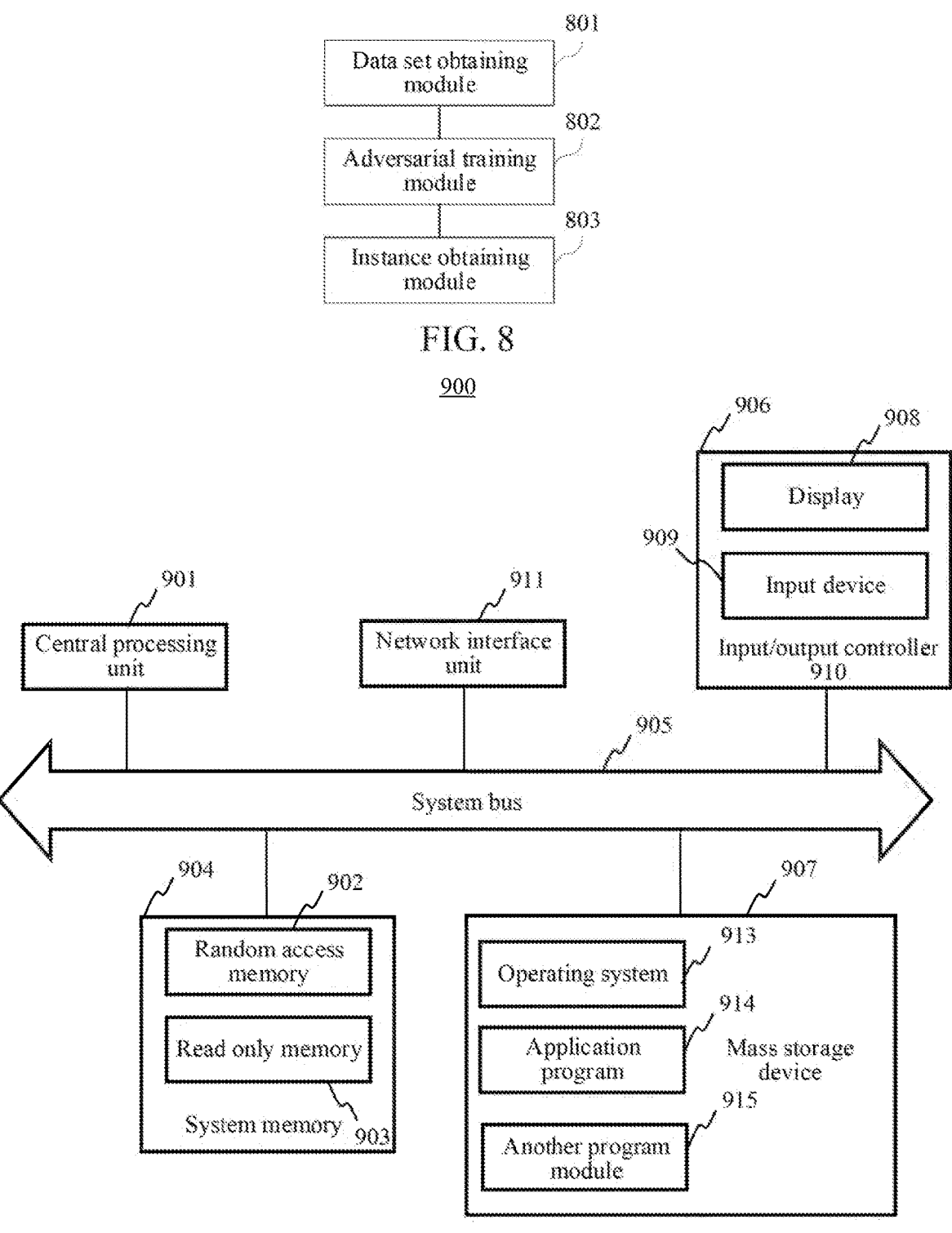
FIG. 8 is a schematic structural diagram of a text-based event detection apparatus according to an exemplary embodiment.
FIG. 9 is a schematic structural diagram of a computer device according to an exemplary embodiment.

FIG. 8 is a schematic structural diagram of a training apparatus according to an exemplary embodiment. The training apparatus may be used in a computer device, in order to perform all or part of the steps in the embodiments shown in FIG. 1 or FIG. 3. The apparatus includes functional modules or units that implement the above method, and each functional module or unit may be implemented in whole or in part by software, hardware, or a combination thereof. The apparatus may include a data set obtaining module 801, configured to obtain a first data set and a second data set that respectively include event instances. The event instances include text and events corresponding to the text, the first data set including standard event instances, and the second data set including non-standard event instances. An adversarial training module 802 is configured to train an adversarial network using the first data set and the second data set, the adversarial network including a generator and a discriminator. The generator is configured to select event instances from the second data set and input the selected event instances to the discriminator, and the discriminator is configured to output first reliable probabilities of the event instances in the first data set, and second reliable probabilities of the event instances inputted by the generator. A loss function of the adversarial network is used to adjust a parameter of the adversarial network, to maximize the first reliable probabilities and minimize the second reliable probabilities. An instance obtaining module 803 is configured to obtain, by a trained adversarial network, a reliable event instance in the second data set. One or more of the modules can be implemented by processing circuitry, software, or a combination thereof, for example.

In an embodiment, the adversarial network further includes an encoder, and the adversarial training module 802 is configured to encode, by the encoder, each event instance in the first data set and the second data set during each round of adversarial training, to obtain an embedding vector of each event instance in the first data set and the second data set. The embedding vector is used for indicating each word in the text corresponding to the event instance, and a positional relation between words. The adversarial training module 802 is configured to process, by the generator, the embedding vector of each event instance in the second data set, to obtain a confusion probability of each event instance in the second data set. The confusion probability is used for indicating a probability that the discriminator incorrectly discriminates whether the corresponding event instance is reliable. The adversarial training module 802 is also configured to select second event instances from the second data set, according to the confusion probability of each event instance in the second data set. The adversarial training module 802 is configured to process, by the discriminator, the embedding vectors of first event instances and the second event instances, to obtain an output result of the discriminator. The output result includes the first reliable probabilities of the first event instances, and the second reliable probabilities of the second event instances. The first event instances are the event instances in the first data set. The adversarial training module 802 is configured to calculate a loss value according to the loss function, an output result of the generator, and the output result of the discriminator, in a case that the output result of the discriminator is not converged, and adjust the parameter of the adversarial network according to the loss value.

In an embodiment, the loss function includes a first loss function, and when calculating a loss value according to the loss function, an output result of the generator, and the output result of the discriminator, the adversarial training module 802 is configured to calculate a first loss value according to the first loss function, the first reliable probabilities of the first event instances, the second reliable probabilities of the second event instances, and the confusion probabilities of the second event instances. When adjusting the parameter of the adversarial network according to the loss value, the adversarial training module 802 is configured to adjust parameters of the encoder and the discriminator according to the first loss value.

In an embodiment, the loss function includes a second loss function, and when calculating a loss value according to the loss function, an output result of the generator, and the output result of the discriminator, the adversarial training module 802 is configured to calculate a second loss value according to the second loss function, the second reliable probabilities of the second event instances, and the confusion probabilities of the second event instances. When adjusting the parameter of the adversarial network according to the loss value, the adversarial training module 802 is configured to adjust a parameter of the generator according to the second loss value.

In an embodiment, when calculating a second loss value according to the second loss function, the second reliable probabilities of the second event instances, and the confusion probabilities of the second event instances, the adversarial training module 802 is configured to obtain an average reliable probability of the second event instances, according to the second reliable probabilities of the second event instances. The adversarial training module 802 is also configured to calculate the second loss value, according to the second loss function, the average reliable probability, and the confusion probabilities of the second event instances.

In an embodiment, when calculating a loss value according to the loss function, an output result of the generator, and the output result of the discriminator, the adversarial training module 802 is configured to sample the first event instances, to obtain first sampling instances. The adversarial training module 802 is also configured to sample the second event instances, to obtain second sampling instances, and calculate the loss value according to the loss function, an output result of the generator for the second sampling instances, and output results of the discriminator respectively for the first sampling instances and the second sampling instances.

In an embodiment, the instance obtaining module 803 is configured to add a target event instance in the second data set selected by a trained generator to the first data set, in a case that the reliable probability of the target event instance outputted by a trained discriminator is higher than a first probability threshold.

In an embodiment, the data set obtaining module 801 is configured to obtain the first data set, and obtain an event labeling rule according to the first data set, the event labeling rule including a correspondence between events of standard instances and trigger words in text of the standard instances, the standard instances being the event instances in the first data set. The data set obtaining module 801 is also configured to label each text other than the first data set according to the event labeling rule, to obtain a candidate data set. The data set obtaining module 801 is also configured to pre-train the discriminator using the first data set, to obtain a pre-trained discriminator. The data set obtaining module 801 is also configured to process, by the pre-trained discriminator, each event instance in the candidate data set, to obtain a reliable probability of each event instance in the candidate data set. The data set obtaining module 801 is also configured to extract the second data set from the candidate data set, according to the reliable probability of each event instance in the candidate data set.

In an embodiment, when obtaining the first data set, the data set obtaining module 801 is configured to obtain a first data set that is manually labeled.

In an embodiment, the data set obtaining module 801 is configured to label each text according to a preset event labeling rule, to obtain an initial data set, the event labeling rule including a correspondence between an event and a trigger word. The data set obtaining module 801 is also configured to pre-train the discriminator using the initial data set, and process, by the pre-trained discriminator, each event instance in the initial data set, to obtain a reliable probability of each event instance in the initial data set. The data set obtaining module 801 is also configured to obtain the first data set and the second data set from the initial data set, according to the reliable probability of each event instance in the initial data set.

In an embodiment, when obtaining the first data set and the second data set from the initial data set, according to the reliable probability of each event instance in the initial data set, the data set obtaining module 801 is configured to add each event instance in the initial data set whose reliable probability is higher than a second probability threshold into the first data set; and add each event instance in the initial data set whose reliable probability is lower than or equal to the second probability threshold into the second data set.

From above, in the solution according to the embodiments of this application, the generator and the discriminator in the adversarial network are trained using the first data set including the standard event instances and the second data set including the non-standard event instances, so that the trained discriminator can accurately discriminate whether the event instances in the second data set are reliable. On the one hand, this solution requires less amount of manual labeling, which saves the data preparation time, thereby improving the efficiency of the text-based event detection. On the other hand, this solution performs the event detection by the adversarial network, which can accurately eliminate noisy data from the second data set, thereby enhancing the accuracy of the event detection.

FIG. 9 is a schematic structural diagram of a computer device according to an exemplary embodiment. The device 900 includes a central processing unit (CPU) 901 (processing circuitry), a system memory 904 (non-transitory computer-readable storage medium) including a random access memory (RAM) 902 and a read only memory (ROM) 903, and a system bus 905 connecting the system memory 904 and the CPU 901. The computer device 900 further includes a basic input/output (I/O) system 906 assisting in transmitting information between components in the computer, and a mass storage device 907 configured to store an operating system 913, an application program 914, and another program module 915.

The basic I/O system 906 includes a display 908 configured to display information and an input device 909 such as a mouse or a keyboard that is used for inputting information by a user. The display 908 and the input device 909 are both connected to the CPU 901 by using an input/output controller 910 connected to the system bus 905. The basic input/output system 906 may further include the input/output controller 910 configured to receive and process input from multiple other devices such as the keyboard, the mouse, or an electronic stylus. Similarly, the input/output controller 910 further provides an output to a display screen, a printer, or another type of output device.

The mass storage device 907 is connected to the CPU 901 by using a mass storage controller (not shown) connected to the system bus 905. The mass storage device 907 and a computer-readable medium associated therewith provide non-volatile and non-transitory storage to the computer device 900. That is, the mass storage device 907 may include the computer-readable medium (not shown) such as a hard disk or a CD-ROM drive.

In general, the computer-readable medium may include a computer storage medium and a communication medium. The computer storage medium includes volatile and non-volatile, removable and non-removable media that store information such as computer-readable instructions, data structures, program modules, or other data, and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, a person skilled in the art can know that the computer storage medium is not limited to the foregoing several types. The system memory 904 and the mass storage device 907 may be collectively referred to as a memory.

The computer device 900 may be connected to the Internet or another network device by using a network interface unit 911 connected to the system bus 905.

The memory further includes one or more programs. The one or more programs are stored in the memory. The CPU 901 executes the one or more programs to implement all or some steps of any method shown in FIG. 2, FIG. 1, or FIG. 3.

In an exemplary embodiment, a non-transitory computer-readable storage medium including an instruction, for example, a memory including a computer program (an instruction), is further provided, and the program (the instruction) may be executed by a processor of a computer device to complete all or some of steps of the methods shown in the embodiments of this application. For example, the non-transitory computer-readable storage medium may be a ROM, a RAM, a CD-ROM, a magnetic tape, a floppy disk, an optical data storage device, or the like.

After considering the specification and practicing this application, a person skilled in the art may conceive of other implementations of this application. This application is intended to cover any variations, uses, or adaptive changes of this application following the general principles of this application. The specification and the embodiments are considered as merely exemplary, and the scope and spirit of this application are pointed out in the following claims.

It is to be understood that this application is not limited to the precise structures described above and shown in the accompanying drawings, and various modifications and changes can be made without departing from the scope of this application. The scope of this application is subject only to the appended claims.

What is claimed is:

1. A training method comprising:

obtaining a first data set and a second data set, each of the first data set and the second data set comprises event instances, the event instances comprising text and events corresponding to the text, the first data set comprising standard event instances, and the second data set comprising non-standard event instances;

training an adversarial network using the first data set and the second data set, the adversarial network comprising processing circuitry configured as an encoder, a generator, and a discriminator, wherein the training comprises:

encoding, by the encoder, each event instance in the first data set and the second data set during each round of adversarial training, to obtain an embedding vector of each event instance in the first data set and the second data set, the embedding vector indicating each word in the text corresponding to the respective event instance, and a positional relation between words;

selecting, by the generator and based on a confusion probability of each event instance in the second data set, a subset of event instances from the second data set, wherein the confusion probability of each event instance indicates a probability that the discriminator incorrectly discriminates the corresponding event instance;

inputting, to the discriminator, the embedding vectors of the event instances in the first data set and the selected subset of event instances in the second data set;

outputting, by the discriminator, first reliable probabilities of the event instances in the first data set, and second reliable probabilities of the selected subset of event instances in the second data set, wherein a reliable probability of an event instance indicates a probability that the corresponding event instance is reliable;

calculating a first loss function according to the first reliable probabilities of the first event instances, the second reliable probabilities of the second event instances, and the confusion probabilities of the second event instances;

calculating a second loss function according to the second reliable probabilities of the second event instances, and the confusion probabilities of the second event instances; and adjusting one or more parameters of the encoder and the discriminator according to the first loss function, and at least one parameter of the generator according to the second loss function, wherein the adjusting maximizes the first reliable probabilities and minimizes the second reliable probabilities; and obtaining, by the trained adversarial network, a reliable event instance in the second data set.

2. The training method according to claim 1, wherein the training the adversarial network comprises:

processing, by the generator, the embedding vector of each event instance in the second data set, to obtain the confusion probability of each event instance in the second data set; processing, by the discriminator, the embedding vectors of first event instances from the first data set and the second event instances, to obtain an output result of the discriminator, the output result comprising the first reliable probabilities of the first event instances, and the second reliable probabilities of the second event instances;

calculating, in response to a determination that the output result of the discriminator does not converge, a loss value according to one or more of the first loss function, the second loss function, the confusion probabilities obtained by the generator, and the output result of the discriminator; and adjusting the parameter of the adversarial network according to the loss value.

3. The training method according to claim 2, wherein the calculating the loss value comprises:

sampling the first event instances, to obtain first sampling instances;

sampling the second event instances, to obtain second sampling instances; and calculating the loss value according to one or more of the first loss function, the second loss function, the confusion probabilities obtained by the generator for the second sampling instances, and an output result of the discriminator respectively for the first sampling instances and the second sampling instances.

4. The training method according to claim 1, wherein the calculating the second loss value comprises: obtaining an average reliable probability of the second event instances, according to the second reliable probabilities of the second event instances; and calculating the second loss value, according to the second loss function, the average reliable probability, and the confusion probabilities of the second event instances.

5. The training method according to claim 1, wherein the obtaining the reliable event instance in the second data set comprises:

adding a target event instance selected from the second data set by a trained generator to the first data set, in response to a determination that the second reliable probability of the target event instance outputted by the discriminator of the trained adversarial network is higher than a first probability threshold.

6. The training method according to claim 1, wherein the obtaining the first data set and the second data set comprises:

obtaining the first data set;

obtaining an event labeling rule according to the first data set, the event labeling rule comprising a correspondence between the standard event instances and trigger words in text of the standard event instances;

labeling each piece of text not included in the first data set according to the event labeling rule, to obtain a candidate data set;

pre-training the discriminator using the first data set, to obtain a pre-trained discriminator;

processing, by the pre-trained discriminator, each event instance in the candidate data set, to obtain a reliable probability of each event instance in the candidate data set; and extracting the second data set from the candidate data set, according to the reliable probability of each event instance in the candidate data set.

7. The training method according to claim 6, wherein the obtaining the first data set comprises:

obtaining the first data set that is manually labeled.

8. The training method according to claim 1, wherein the obtaining the first data set and the second data set comprises:

labeling each piece of text in event instances of an initial data set according to a preset event labeling rule, the event labeling rule comprising a correspondence between an event and a trigger word;

pre-training the discriminator using the initial data set;

processing, by the pre-trained discriminator, each event instance in the initial data set, to obtain a reliable probability of each event instance in the initial data set; and obtaining the first data set and the second data set from the initial data set, according to the reliable probability of each event instance in the initial data set.

9. The training method according to claim 8, wherein the obtaining the first data set and the second data set from the initial data set comprises:

adding each event instance in the initial data set whose reliable probability is higher than a second probability threshold into the first data set; and adding each event instance in the initial data set whose reliable probability is lower than or equal to the second probability threshold into the second data set.

10. A non-transitory computer-readable storage medium, storing computer-readable instructions, which, when executed by one or more processors, cause the one or more processors to perform the training method according to claim 1.

11. A text-based event detection method comprising:

obtaining a text to be processed;

processing, by processing circuitry of an adversarial network, the text, the adversarial network having been trained using a first data set and a second data set, the first data set comprising standard event instances, the second data set comprising non-standard event instances, the adversarial network comprising an encoder, a generator, and a discriminator, wherein the adversarial network is trained by:

encoding, by the encoder, each event instance in the first data set and the second data set during each round of adversarial training, to obtain an embedding vector of each event instance in the first data set and the second data set, the embedding vector indicating each word in the text corresponding to the respective event instance, and a positional relation between words;

selecting, by the generator and based on a confusion probability of each event instance in the second data set, a subset of event instances from the second data set, wherein the confusion probability of each event instance indicates a probability that the discriminator incorrectly discriminates the corresponding event instance;

inputting, to the discriminator, the embedding vectors of the event instances in the first data set and the selected subset of event instances in the second data set;

outputting, by the discriminator, first reliable probabilities of the event instances in the first data set, and second reliable probabilities of the selected subset of event instances in the second data set, wherein a reliable probability of an event instance indicates a probability that the corresponding event instance is reliable;

calculating a first loss function-according to the first reliable probabilities of the first event instances, the second reliable probabilities of the second event instances, and the confusion probabilities of the second event instances; and calculating a second loss function according to the second reliable probabilities of the second event instances, and the confusion probabilities of the second event instances; and adjusting one or more parameters of the encoder and the discriminator according to the first loss function, and at least one parameter of the generator according to the second loss function, wherein the adjusting maximizes the first reliable probabilities and minimizes the second reliable probabilities; and obtaining an event corresponding to the text, according to an output result of the discriminator in the adversarial network for the text.

12. A training apparatus comprising:

processing circuitry configured to obtain a first data set and a second data set, each of the first data set and the second data set comprises event instances, the event instances comprising text and events corresponding to the text, the first data set comprising standard event instances, and the second data set comprising non-standard event instances;

train an adversarial network using the first data set and the second data set, the adversarial network comprising an encoder, a generator, and a discriminator, wherein the processing circuitry is configured to train the adversarial network by:

causing the encoder to encode each event instance in the first data set and the second data set during each round of adversarial training, to obtain an embedding vector of each event instance in the first data set and the second data set, the embedding vector indicating each word in the text corresponding to the respective event instance, and a positional relation between words;

causing the generator to:

select, based on a confusion probability of each event instance in the second data set, a subset of event instances from the second data set, wherein the confusion probability of each event instance indicates a probability that the discriminator incorrectly discriminates the corresponding event instance;

input, to the discriminator, the embedding vectors of the event instances in the first data set and the selected subset of event instances in the second data set; and causing the discriminator to output first reliable probabilities of the event instances in the first data set, and second reliable probabilities of the selected subset of event instances in the second data set, wherein a reliable probability of an event instance indicates a probability that the corresponding event instance is reliable;

calculating a first loss function according to the first reliable probabilities of the first event instances, the second reliable probabilities of the second event instances, and the confusion probabilities of the second event instances;

calculating a second loss function according to the second reliable probabilities of the second event instances, and the confusion probabilities of the second event instances; and adjusting one or more parameters of the encoder and the discriminator according to the first loss function, and at least one parameter of the generator according to the second loss function the adversarial network, wherein the adjusting maximizes the first reliable probabilities and minimizes the second reliable probabilities; and obtain, by the trained adversarial network, a reliable event instance in the second data set.

13. The training apparatus according to claim 12, wherein the processing circuitry is configured to calculate the second loss value by obtaining an average reliable probability of the second event instances, according to the second reliable probabilities of the second event instances; and calculating the second loss value, according to the second loss function, the average reliable probability, and the confusion probabilities of the second event instances.

14. The training apparatus according to claim 12, wherein the processing circuitry is configured to process, by the generator, the embedding vector of each event instance in the second data set, to obtain the confusion probability of each event instance in the second data set;

process, by the discriminator, the embedding vectors of first event instances from the first data set and the second event instances, to obtain an output result of the discriminator, the output result comprising the first reliable probabilities of the first event instances, and the second reliable probabilities of the second event instances;

calculate, in response to a determination that the output result of the discriminator does not converge, a loss value according to one or more of the first loss function, the second loss function, the confusion probabilities obtained by the generator, and the output result of the discriminator; and adjust the parameter of the adversarial network according to the loss value.

15. The training apparatus according to claim 14, wherein the processing circuitry is configured to calculate the loss value by sampling the first event instances, to obtain first sampling instances;

sampling the second event instances, to obtain second sampling instances; and calculating the loss value according to one or more of the first loss function, the second loss function, the confusion probabilities obtained by the generator for the second sampling instances, and output results of the discriminator respectively for the first sampling instances and the second sampling instances.

16. The training apparatus according to claim 12, wherein the processing circuitry is configured to obtain the reliable event instance in the second data set by adding a target event instance selected from the second data set by a trained generator to the first data set, in response to a determination that the second reliable probability of the target event instance outputted by the discriminator of the trained adversarial network is higher than a first probability threshold.

* * * * *